United States Patent
Kim

(10) Patent No.: US 10,811,886 B2
(45) Date of Patent: Oct. 20, 2020

(54) CHARGE CONTROL APPARATUS CAPABLE OF HIGH SPEED CELL BALANCING AND ENERGY SAVING AND METHOD THEREOF

(71) Applicant: LG CHEM, LTD., Seoul (KR)

(72) Inventor: Won-Gon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 16/094,162

(22) PCT Filed: Jan. 9, 2018

(86) PCT No.: PCT/KR2018/000439
§ 371 (c)(1),
(2) Date: Oct. 16, 2018

(87) PCT Pub. No.: WO2018/131874
PCT Pub. Date: Jul. 19, 2018

(65) Prior Publication Data
US 2019/0097434 A1  Mar. 28, 2019

(30) Foreign Application Priority Data

Jan. 10, 2017 (KR) .................. 10-2017-0003759
Jan. 8, 2018 (KR) .................. 10-2018-0002508

(51) Int. Cl.
*H02J 7/00* (2006.01)
*B60L 58/22* (2019.01)
(Continued)

(52) U.S. Cl.
CPC ............ *H02J 7/0016* (2013.01); *B60L 58/22* (2019.02); *H01M 10/425* (2013.01);
(Continued)

(58) Field of Classification Search
CPC . B60L 58/22; H02J 7/0013; H02J 7/00; H02J 7/0019; H02J 7/0016; H01M 10/425;
(Continued)

(56) References Cited

U.S. PATENT DOCUMENTS 5,659,237 A * 8/1997 Divan .................. H02J 7/0018
320/119
5,889,385 A * 3/1999 Podrazhansky ....... H02J 7/0016
320/130
(Continued)

FOREIGN PATENT DOCUMENTS

EP  2583858 A1  4/2013
JP  2001-8373 A  1/2001
(Continued)

OTHER PUBLICATIONS

International Search Report issued in PCT/KR2018/000439 (PCT/ISA/210), dated May 4, 2018.

*Primary Examiner* — Naum Levin
(74) *Attorney, Agent, or Firm* — Birch, Stewart, Kolasch & Birch, LLP

(57) ABSTRACT

A charge control apparatus and method for energy saving and high speed cell balancing, including when any one of a plurality of battery cells reaches a fully charged state, charging is temporarily stopped. Additionally, a battery cell with the lowest state of charge is determined to be a target for supplemental charging and the remaining battery cells are determined to be a target for forced discharging and when among the battery cells being forcedly discharged, the number of battery cells with the same state of charge as the state of charge of the battery cell being supplementally charged is equal to or larger than a reference number, cell balancing is stopped and charging is performed again.

12 Claims, 3 Drawing Sheets

(51) Int. Cl.
  *H01M 10/42* (2006.01)
  *H01M 10/44* (2006.01)
  *H01M 10/48* (2006.01)

(52) U.S. Cl.
  CPC ..... *H01M 10/4207* (2013.01); *H01M 10/441* (2013.01); *H01M 10/482* (2013.01); *H02J 7/00* (2013.01); *H02J 7/0013* (2013.01); *H02J 7/0019* (2013.01); *H01M 2010/4271* (2013.01); *H01M 2220/20* (2013.01); *Y02T 10/92* (2013.01); *Y02T 90/14* (2013.01)

(58) Field of Classification Search
  CPC ........... H01M 10/4207; H01M 10/482; H01M 10/441; H01M 10/0525; H01M 2010/4271; H01M 2220/20; Y02T 10/92; Y02T 10/7005; Y02T 90/14
  See application file for complete search history.

(56) References Cited

U.S. PATENT DOCUMENTS

| | | | | |
|---|---|---|---|---|
| 5,900,716 | A | 5/1999 | Collar et al. | |
| 5,905,360 | A | 5/1999 | Ukita | |
| 6,583,602 | B2* | 6/2003 | Imai | H02J 7/0018 320/118 |
| 6,844,703 | B2* | 1/2005 | Canter | B64G 1/425 320/131 |
| 7,400,113 | B2* | 7/2008 | Osborne | H02J 7/0018 320/118 |
| 7,408,325 | B2 | 8/2008 | Yamamoto et al. | |
| 7,489,106 | B1* | 2/2009 | Tikhonov | H02J 7/0018 320/116 |
| 7,812,572 | B2* | 10/2010 | Bolz | H02J 7/0018 320/116 |
| 7,880,433 | B2* | 2/2011 | Oh | H02J 7/0016 320/118 |
| 7,939,965 | B2* | 5/2011 | Oh | H02J 7/0016 307/43 |
| 8,159,184 | B2* | 4/2012 | Emori | B60L 3/0046 320/116 |
| 8,288,991 | B2* | 10/2012 | Sardat | B60L 3/06 320/118 |
| 8,536,824 | B2* | 9/2013 | St-Jacques | H02J 7/0016 320/103 |
| 8,947,048 | B2* | 2/2015 | Roessler | H02J 7/0016 320/103 |
| 9,231,416 | B2* | 1/2016 | Kim | H02J 7/0026 |
| 9,431,837 | B2* | 8/2016 | Brockman | H02J 7/0047 |
| 9,755,439 | B2* | 9/2017 | Yamamoto | H02J 7/0016 |
| 9,774,206 | B2* | 9/2017 | Kim | H02J 7/0016 |
| 10,128,529 | B2* | 11/2018 | Nakagawa | G01R 31/44 |
| 10,416,238 | B2* | 9/2019 | Nortman | G01R 31/3835 |
| 2004/0164706 | A1 | 8/2004 | Osborne | |
| 2009/0096419 | A1 | 4/2009 | White et al. | |
| 2010/0244781 | A1* | 9/2010 | Kramer | H02J 7/0016 320/162 |
| 2010/0283433 | A1* | 11/2010 | Oh | H02J 7/0016 320/162 |
| 2011/0001352 | A1* | 1/2011 | Tamura | B60R 16/033 307/9.1 |
| 2011/0006734 | A1* | 1/2011 | Kirimoto | B60L 3/0046 320/118 |
| 2011/0115436 | A1* | 5/2011 | Zhang | H01M 10/44 320/134 |
| 2011/0304299 | A1 | 12/2011 | Yang et al. | |
| 2011/0316344 | A1* | 12/2011 | Van Lammeren | H01M 10/42 307/77 |
| 2012/0169284 | A1 | 7/2012 | Park | |
| 2012/0293129 | A1 | 11/2012 | Naghshtabrizi et al. | |
| 2013/0127399 | A1* | 5/2013 | Tang | B60L 1/003 320/104 |
| 2014/0232302 | A1* | 8/2014 | Tsushima | B60L 58/20 318/139 |
| 2014/0320088 | A1* | 10/2014 | Nysen | H02J 7/0016 320/150 |
| 2014/0340023 | A1* | 11/2014 | Shu | H02J 7/0018 320/107 |
| 2016/0049809 | A1 | 2/2016 | Kajitani et al. | |
| 2017/0025867 | A1* | 1/2017 | Wang | H02J 7/0019 |
| 2017/0271889 | A1* | 9/2017 | Sugeno | B60L 58/22 |
| 2019/0109468 | A1* | 4/2019 | Lòpez | H02J 7/0014 |

FOREIGN PATENT DOCUMENTS

| | | |
|---|---|---|
| JP | WO2014/156564 A1 | 2/2017 |
| KR | 10-2003-0096978 A | 12/2003 |
| KR | 10-2011-0134741 A | 12/2011 |
| KR | 10-2012-0078842 A | 7/2012 |
| KR | 10-2015-0115281 A | 10/2015 |
| KR | 10-1602277 B1 | 3/2016 |
| KR | 10-2016-0046221 A | 4/2016 |

* cited by examiner

CHARGE CONTROL APPARATUS CAPABLE OF HIGH SPEED CELL BALANCING AND ENERGY SAVING AND METHOD THEREOF

TECHNICAL FIELD

The present disclosure relates to a charge control apparatus and method having effects of energy saving and high speed balancing during cell balancing involved when fully charging a high voltage battery including a plurality of battery cells.

The present application claims priority to Korean Patent Application No. 10-2017-0003759 filed in the Republic of Korea on Jan. 10, 2017 and Korean Patent Application No. 10-2018-0002508 filed in the Republic of Korea on Jan. 8, 2018, the disclosures of which are incorporated herein by reference.

BACKGROUND ART

Batteries are used in mobile devices such as mobile phones, laptop computers, smart phones and smart pads, and besides, their range of applications is rapidly expanding in the fields such as vehicles powered by electricity (EV, HEV, PHEV) or large capacity energy storage system (ESS).

A high voltage battery mounted in an electric vehicle includes a plurality of battery cells connected in series. In some instances, each battery cell may include a plurality of unit cells connected in parallel.

The battery cell as used herein may include one unit cell or a plurality of unit cells connected in parallel. The unit cell refers to a single independent cell that has a negative electrode terminal and a positive electrode terminal and can be physically separated. For example, a pouch-type lithium polymer cell may be regarded as a unit cell.

The battery cells constituting the high voltage battery do not have the same electrochemical properties. Additionally, when the number of charge/discharge cycles of the high voltage battery increase, each battery cell differs in the extent of degradation, and a difference in performance between the battery cells increases. Accordingly, the state of charge of each battery cell increases at different rates during charging of the high voltage battery until full charge state.

Here, the state of charge is a parameter numerically indicating a ratio of capacity the battery cell has been charged so far on the basis of full charge capacity. The state of charge is expressed as % or a number between 0 and 1. As the number of charge/discharge cycles of the battery cell increases, the full charge capacity slowly reduces.

During charging of the high voltage battery until full charge state, a degraded battery cell increases in the state of charge at higher speed than a less degraded battery cell. This is because the full charge capacity of degraded battery cell is lower than that of non-degraded battery cell. Accordingly, during charging of the high voltage battery, the state of charge of each battery cell differs from each other.

Conventional high voltage battery charging technology includes temporarily stopping charging and performing cell balancing to reduce a difference in the state of charge between battery cells.

There are many types of cell balancing technologies, and due to the benefit of simple circuit configuration, buck balancing technology forcedly discharging a battery cell with a higher state of charge is mainly used.

However, buck balancing has the following problems; energy is consumed during cell balancing. Additionally, when buck balancing is performed, the state of charge of all the battery cells reduces and the charging time taken to fully charge the battery cells increases as much.

FIG. 1 is a conceptual diagram illustrating the problems of the conventional buck balancing technology.

Referring to FIG. 1, n battery cells are connected in series to form a high voltage battery. The high voltage battery is connected to a charging power source unit 10 for charging.

Each battery cell is individually connected to a discharge circuit including a switch $S_1$-$S_n$ and a discharge resistor $R_1$-$R_n$. When the switch of any one discharge circuit is turned on, the battery cell connected to the corresponding discharge circuit is discharged and the state of charge of the battery cell is lowered.

In FIG. 1, the numerical value indicated on the right side of each battery cell denotes the state of charge. The state of charge of the first cell and the $n^{th}$ cell is 100%, the state of charge of the second cell is 90%, and the state of charge of the $n-1^{th}$ cell is 80%. Among the n battery cells, the state of charge of the $n-1^{th}$ battery cell is lowest. The height of the hatched area indicated in each battery cell denotes the magnitude of the state of charge, and the same is applied below.

When the state of charge of the first cell and the $n^{th}$ cell becomes 100% during charging of the high voltage battery as shown in FIG. 1, charging is temporarily stopped and buck balancing process through forcible discharging is performed. This is because if charging continues, the first cell and the $n^{th}$ cell are over-charged.

Buck balancing is performed until the state of charge of the first cell and $n^{th}$ cell with 100% state of charge and the state of charge of the second cell with 90% state of charge reaches the lowest state of charge of the $n-1^{th}$ cell.

During buck balancing, the switches $S_1$, $S_2$, $S_n$ included in the discharge circuits connected to the first cell, the second cell and the $n^{th}$ cell maintains turn-on state, and the state of charge of each cell is reduced to 80%.

In this process, the first cell and the $n^{th}$ cell have energy consumption corresponding to 20% state of charge, and the second cell has energy consumption corresponding to 10% state of charge. Additionally, because the state of charge of all the battery cells is reduced to 80%, the time taken to fully charge all the battery cells increases as much. Because the state of charge of all the battery cells is reduced to 80%, a difference between the fully charged state (100%) and the state of charge of the first cell, the second cell and the $n^{th}$ cell is greater than before buck balancing is performed.

Meanwhile, when the state of charge of all the battery cells becomes 80%, charging starts again. However, even after charging starts again, a situation takes place again in which the state of charge of a certain battery cell reaches 100% first.

Accordingly, buck balancing process repeats again to balance down the state of charge by discharging the remaining cells except a cell with lowest state of charge again. In this process, the above-described problem occurs again.

DISCLOSURE

Technical Problem

The present disclosure is designed under the background of the related art as described above, and therefore, the present disclosure is directed to providing an improved charge control apparatus and method for reducing energy consumption in the course of balancing the state of charge of each battery cell through forced discharging during charging of a high voltage battery until fully charged state and further reducing the time taken to fully charge the battery cells.

Technical Solution

To achieve the above-described technical object, a charge control apparatus of a high voltage battery according to the present disclosure is an apparatus for controlling charging of a high voltage battery including first to $n^{th}$ battery cells connected in series.

The charge control apparatus according to the present disclosure includes first to $n^{th}$ discharge circuits connected respectively to the first to $n^{th}$ battery cells; a high voltage charge line through which high voltage charging power is applied to the first battery cell and the $n^{th}$ battery cell, the high voltage charge line including a high voltage charge switch unit; a supplemental charge line through which low voltage charging power is applied; first to $n^{th}$ supplemental charge switch circuits connected respectively to the first to $n^{th}$ battery cells to selectively connect the supplemental charge line to at least one of the first to $n^{th}$ battery cells; and a control unit electrically coupled with the high voltage charge switch unit, the first to $n^{th}$ discharge circuits, and the first to $n^{th}$ supplemental charge switch circuits.

Preferably, the control unit is configured to (a) calculate a state of charge of the first to $n^{th}$ battery cells, (b) turn off the high voltage charge switch unit when at least one of the first to $n^{th}$ battery cells reaches a fully charged state during charging of the first to $n^{th}$ battery cells, (c) determine at least one of the first to $n^{th}$ battery cells with lowest state of charge to be a target for supplemental charging and the remaining battery cells to be a target for forced discharging, (d) operate the discharge circuit connected to each battery cell determined to be the target for forced discharging to forcedly discharge the corresponding battery cell, and at the same time, operate the supplemental charge switch circuit connected to the battery cell determined to be the target for supplemental charging to connect the corresponding battery cell to the supplemental charge line to supplementally charge the battery cell, and (e) when among the battery cells being forcedly discharged, any battery cell with the same state of charge as the battery cell being supplementally charged appears, stop the operation of the discharge circuit connected to the corresponding battery cell and operate the supplemental charge switch circuit connected to the corresponding battery cell.

In an embodiment, each of the first to $n^{th}$ discharge circuits may include a discharge switch and a discharge resistor, and each of the first to $n^{th}$ supplemental charge switch circuits may include a charge switch.

According to another aspect, the control unit may be configured to, (f) when the number of battery cells with the same state of charge is equal to or larger than a reference number during forced discharging and supplemental charging, stop the operation of all the discharge circuits and all the supplemental charge switch circuits, and turn on the high voltage charge switch unit.

According to still another aspect, the control unit may be configured to iteratively execute the control logic of (a) to (f) until the state of charge of the first to $n^{th}$ battery cells reaches a fully charged state.

Preferably, the control unit may be configured to increase the reference number with the increasing number of battery cells to be supplementally charged.

Preferably, the control apparatus according to the present disclosure may include a voltage measuring unit to measure voltage of the first to $n^{th}$ battery cells, a current measuring unit to measure the magnitude of a charge current or discharge current of the first to $n^{th}$ battery cells, and a temperature measuring unit to measure temperature of the first to $n^{th}$ battery cells, and the control unit may be configured to calculate and monitor the state of charge of each battery cell using the measured voltage values, the measured current values and the measured temperature values of the first to $n^{th}$ battery cells.

Preferably, the charge control apparatus according to the present disclosure may further include a connector unit coupled with a charging power source unit, and to which the high voltage charge line and the supplemental charge line are connected, and the supplemental charge line may include a transformer to decrease a charging voltage applied through the connector unit.

There is no limitation in including the transformer in the connector unit.

Preferably, the connector unit may include an input terminal to which a high voltage charging cable extending from the charging power source unit is connected, a first output terminal to which the high voltage charge line is connected, and a second output terminal to which the supplemental charge line is connected.

To achieve the above-described technical object, a charge control method of a high voltage battery according to the present disclosure is a method for controlling charging of a high voltage battery including first to $n^{th}$ battery cells connected in series, and may include a first step of charging the high voltage battery by applying high voltage charging power to the first battery cell and the $n^{th}$ battery cell, a second step of calculating and monitoring a state of charge of the first to $n^{th}$ battery cells, a third step of stopping the application of the high voltage charging power when at least one of the first to $n^{th}$ battery cells reaches a fully charged state during charging of the first to $n^{th}$ battery cells, a fourth step of determining at least one of the first to $n^{th}$ battery cells with lowest state of charge to be a target for supplemental charging and the remaining battery cells to be a target for forced discharging, a fifth step of operating a discharge circuit connected to each battery cell determined to be the target for forced discharging to forcedly discharge the corresponding battery cell, and at the same time, operating a supplemental charge switch circuit connected to each battery cell determined to be the target for supplemental charging to connect the corresponding battery cell to a supplemental charge line to supplementally charge the battery cell, a sixth step of identifying a battery cell with the same state of charge as the battery cell being supplementally charged among the battery cells being forcedly discharged, and a seventh step of stopping the operation of the discharge circuit connected to the identified battery cell and operating the supplemental charge switch circuit connected to the corresponding battery cell.

According to another aspect, the charge control method according to the present disclosure may further include an eighth step of stopping the operation of all the discharge circuits and all the supplemental charge switch circuits when the number of battery cells with the same state of charge is equal to or larger than a reference number while forced discharging and supplemental charging are simultaneously performed, and a ninth step of applying the high voltage charging power again.

Preferably, the charge control method according to the present disclosure may include iteratively performing the first to ninth steps until the state of charge of the first to $n^{th}$ battery cells reaches a fully charged state.

According to still another aspect, the charge control method according to the present disclosure may further include increasing the reference number with the increasing number of battery cells to be supplementally charged.

The technical objects of the present disclosure may be also achieved by a battery pack and a battery management system including the charge control apparatus according to the present disclosure.

Advantageous Effects

According to the present disclosure, as time goes by, the number of target battery cells for supplemental charging increases, while the number of target battery cells for forced discharging reduces. Eventually, the state of charge of all the battery cells reaches 100%. Additionally, as forced discharging and supplemental charging are simultaneously performed while cell balancing is performed, cell balancing is performed with the state of charge of all the battery cells increasing on the average. Accordingly, it is possible to reduce an amount of energy consumed through forced discharging during cell balancing, and reduce the time taken to fully charge the battery cells.

BRIEF DESCRIPTION OF THE DRAWINGS

The accompanying drawings illustrate an embodiment of the present disclosure and together with the following detailed description, serve to provide further understanding of the technical aspects of the present disclosure, and thus, the present disclosure is not construed as being limited to the drawings.

MODE FOR CARRYING OUT THE INVENTION

Figure 1:
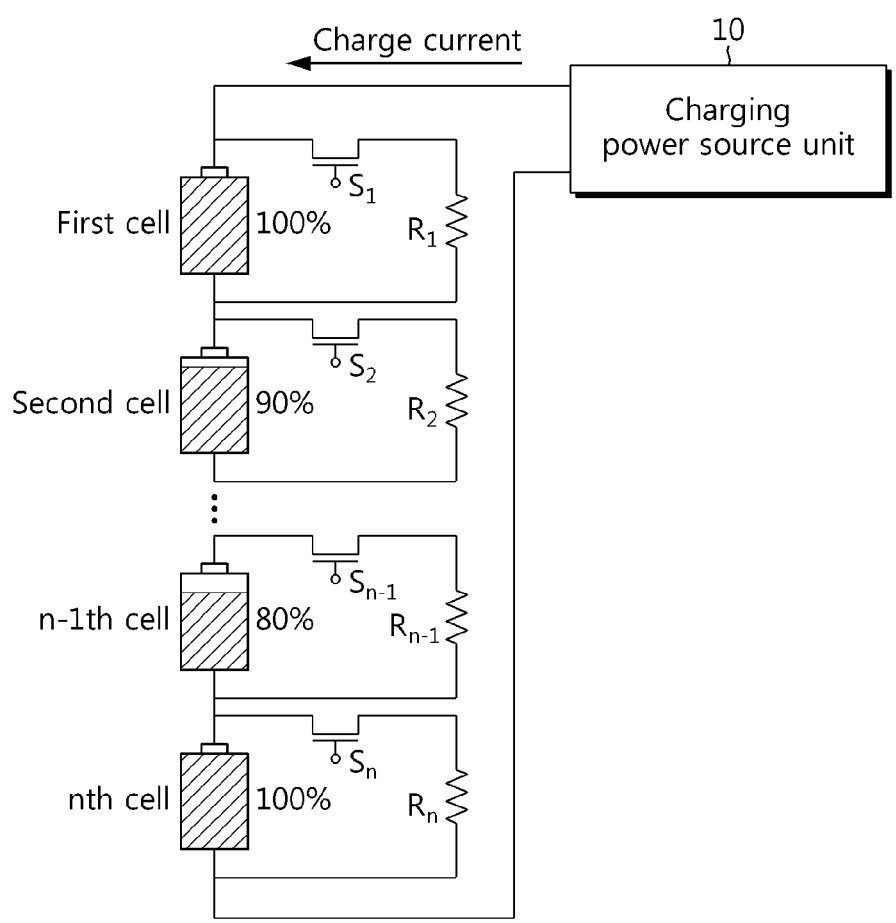
FIG. 1 is a conceptual diagram illustrating a problem of conventional buck balancing technology.

Hereinafter, embodiments of the present disclosure will be described with reference to the accompanying drawings. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just an embodiment of the present disclosure, but not intended to fully describe the technical aspects of the present disclosure, so it should be understood that various other equivalents and modifications could be made thereto at the time the invention was made.

In the embodiments described below, a battery refers to a lithium secondary battery. Here, the lithium secondary battery refers collectively to secondary batteries in which lithium ions act as working ions during charging and discharging, causing electrochemical reactions at the positive electrode and the negative electrode.

Meanwhile, it should be interpreted as that even though the name of the secondary battery changes depending on the type of electrolyte or separator used in the lithium secondary battery, the type of packaging used to package the secondary battery and the internal or external structure of the lithium secondary battery, the lithium secondary battery covers any secondary battery using lithium ions as working ions.

The present disclosure may be also applied to secondary batteries other than lithium secondary batteries. Accordingly, it should be interpreted as that the present disclosure covers any secondary battery to which the technical aspects of the present disclosure may be applied irrespective of the type, even though working ions are not lithium ions.

Additionally, it should be noted that the battery cell may refer to a unit cell or a plurality of unit cells connected in parallel.

Figure 2:
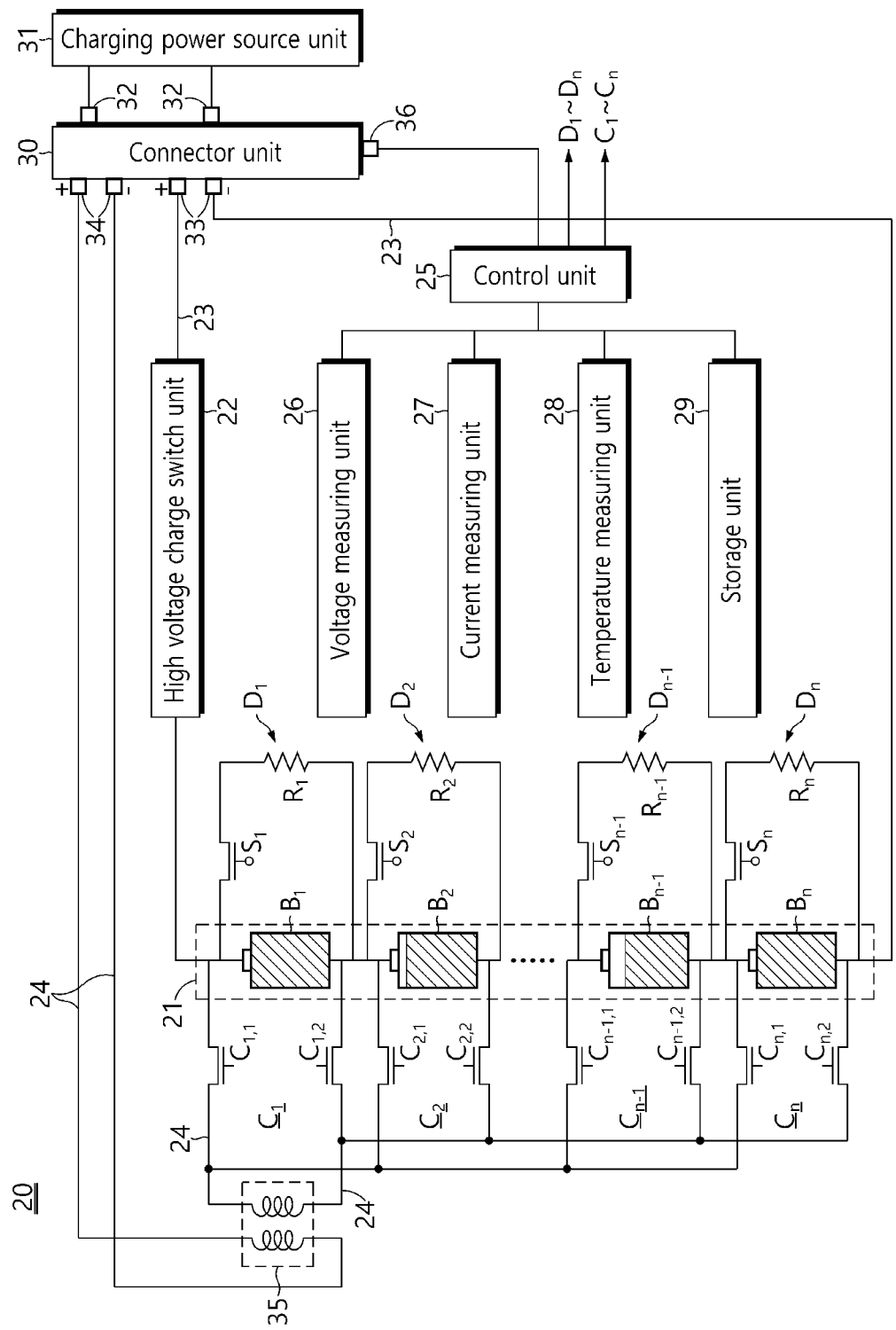
FIG. 2 is a block diagram showing an embodiment of a charge control apparatus of a high voltage battery according to an embodiment of the present disclosure.

FIG. 2 is a block diagram showing an embodiment of a charge control apparatus of a high voltage battery according to an embodiment of the present disclosure.

Referring to FIG. 2, the charge control apparatus 20 according to an embodiment of the present disclosure is an apparatus for controlling the charge of the high voltage battery 21 including first to $n^{th}$ battery cells $B_1, B_2, \ldots, B_{n-1}, B_n$ connected in series.

In an aspect, the charge control apparatus 20 includes a connector unit 30. The connector unit 30 may be detached/attached from/to an external charging power source unit 31.

In an example, when the high voltage battery 21 is a battery mounted in an electric vehicle, the connector unit 30 may be a charging connector provided in the electric vehicle. Additionally, the charging power source unit 31 may be a charger for the electric vehicle.

Preferably, the connector unit 30 includes an input terminal 32 to which high voltage charging power outputted from the charging power source unit 31 is applied.

Additionally, the connector unit 30 includes a first output terminal 33 that outputs high voltage charging power to simultaneously charge the first to $n^{th}$ battery cells $B_1, B_2, \ldots, B_{n-1}, B_n$ during charging of the high voltage battery 21.

Additionally, the connector unit 30 includes a second output terminal 34 that outputs supplemental charging power to supplementally charge at least one battery cell that is not forcedly discharged when cell balancing is performed during charging of the high voltage battery 21 until fully charged state. The first output terminal 33 is connected to a high voltage charge line 23, and the second output terminal 34 is connected to a supplemental charge line 24.

In an aspect, the magnitude of charging power outputted from the first output terminal 33 and the second output terminal 24 may be equal. In this case, optionally, the supplemental charge line 24 may further include a transformer 35 to reduce the charging power to the level on which at least one battery cell can be supplementally charged. The power conversion ratio of the transformer 35 may be determined beforehand based on the number of battery cells to supplementally charge through the supplemental charge line 24. The number of battery cells that can be supplementally charged may be selected within the range of 1 to n−1. Here, n is the total number of battery cells.

The transformer 35 may be included in the connector unit 30 as opposed to that shown in the drawing. In this case, the transformer 35 is electrically connected between the input terminal 32 and the second output terminal 34, to convert the charging power supplied through the input terminal 32 to supplemental charging power.

The charge control apparatus 20 includes first to $n^{th}$ discharge circuits $D_1, D_2, \ldots, D_{n-1}, D_n$ connected respectively to the first to $n^{th}$ battery cells $B_1, B_2, \ldots, B_{n-1}, B_n$.

Preferably, the first discharge circuit $D_1$ includes a discharge switch $S_1$ and a discharge resistor $R_1$. Similarly, the second discharge circuit $D_2$ includes a discharge switch $S_2$ and a discharge resistor $R_2$. Similarly, the n-1$^{th}$ discharge circuit $D_{n-1}$ includes a discharge switch $S_{n-1}$ and a discharge resistor $R_{n-1}$. Similarly, the n$^{th}$ discharge circuit $D_n$ includes a discharge switch $S_n$ and a discharge resistor $R_n$. Although not shown, the third discharge circuit $D_3$ to n-2$^{th}$ discharge circuit $D_{n-2}$ have the same configuration.

Additionally, the charge control apparatus 20 includes a high voltage charge line 23 on which a high voltage charge switch unit 22 is provided to apply high voltage charging power to the first battery cell $B_1$ and the n$^{th}$ battery cell $B_n$. The high voltage charge line 23 is electrically coupled with the first output terminal 33 of the connector unit 30.

Additionally, the charge control apparatus 20 includes the supplemental charge line 24 to supplementally charge at least one battery cell that is not forcedly discharged while cell balancing is performed by a forced discharging method. The supplemental charge line 24 is electrically coupled with the second output terminal 34 of the connector unit 30.

Additionally, the charge control apparatus 20 includes first to n$^{th}$ supplemental charge switch circuits $C_1, C_2, \ldots, C_{n-1}, C_n$ connected respectively to the first to n$^{th}$ battery cells $B_1, B_2, \ldots, B_{n-1}, B_n$ to selectively connect the supplemental charge line 24 to one or more battery cell(s) selected from the first to n$^{th}$ battery cells $B_1, B_2, \ldots, B_{n-1}, B_n$.

Preferably, the first supplemental charge switch circuit $C_1$ includes a first switch $C_{1,1}$ and a second switch $C_{1,2}$ connected respectively to the positive electrode and the negative electrode of the first battery cell $B_1$. Similarly, the second supplemental charge switch circuit $C_2$ includes a first switch $C_{2,1}$ and a second switch $C_{2,2}$. Similarly, the n-1$^{th}$ supplemental charge switch circuit $C_{n-1}$ includes a first switch $C_{n-1,1}$ and a second switch $C_{n-1,2}$. Similarly, the n$^{th}$ supplemental charge switch circuit $C_n$ includes a first switch $C_{n,1}$ and a second switch $C_{n,2}$. Although not shown, the third supplemental charge switch circuit $C_3$ to n-2$^{th}$ supplemental charge switch circuit $C_{n-2}$ have the same configuration.

Additionally, the charge control apparatus 20 includes a control unit 25 electrically coupled with the high voltage charge switch unit 22, the first to n$^{th}$ discharge circuits $D_1, D_2, \ldots, D_{n-1}, D_n$, and the first to n$^{th}$ supplemental charge switch circuits $C_1, C_2, \ldots, C_{n-1}, C_n$.

Here, electrical coupling refers to the case in which the control unit 25 is electrically coupled with the high voltage charge switch unit 22, the first to n$^{th}$ discharge circuits $D_1, D_2, \ldots, D_{n-1}, D_n$ and the first to n$^{th}$ supplemental charge switch circuits $C_1, C_2, \ldots, C_{n-1}, C_n$ to actively control the operation of the high voltage charge switch unit 22, the first to n$^{th}$ discharge circuits $D_1, D_2, \ldots, D_{n-1}, D_n$ and the first to n$^{th}$ supplemental charge switch circuits $C_1, C_2, \ldots, C_{n-1}, C_n$.

Preferably, the control unit 25 outputs a signal that controls the turn-on or turn-off of the high voltage charge switch unit 22. Additionally, the control unit 25 outputs a signal that may individually control the turn-on or turn-off of the discharge switches $S_1, S_2, \ldots, S_{n-1}, S_n$ included in the first to n$^{th}$ discharge circuits $D_1, D_2, \ldots, D_{n-1}, D_n$. Additionally, the control unit 25 outputs a signal that may individually control the turn-on or turn-off of the first switches $C_{1,1}, C_{2,1}, \ldots, C_{n-1,1}, C_{n,1}$ and the second switches $C_{1,2}, C_{2,2}, \ldots, C_{n-1,2}, C_{n,2}$ included in the first to n$^{th}$ supplemental charge switch circuits $C_1, C_2, \ldots, C_{n-1}, C_n$.

Preferably, the charge control apparatus 20 may include a storage unit 29. The storage unit 29 is not limited to a particular type as long as it is a storage medium capable of recording and erasing information.

For example, the storage unit 29 may be RAM, ROM, EEPROM, register, flash memory, hard disk, optical recording media or magnetic recording media.

The storage unit 29 may be also electrically connected to the control unit 25, for example, through a data bus, to allow the control unit 25 to access the storage unit 29.

The storage unit 29 also stores and/or updates and/or erases and/or transmits programs including various control logics that are executed by the control unit 25, and/or data created when the control logic is executed.

The storage unit 29 may be logically split into two or more, and may be included in the control unit 25 without limitations.

Preferably, the charge control apparatus 20 includes a voltage measuring unit 26 to measure the voltage of the first to n$^{th}$ battery cells $B_1, B_2, \ldots, B_{n-1}, B_n$, a current measuring unit 27 to measure the magnitude of charge current or discharge current for the first to n$^{th}$ battery cells $B_1, B_2, \ldots, B_{n-1}, B_n$, and a temperature measuring unit 28 to measure the temperature of the first to n$^{th}$ battery cells $B_1, B_2, \ldots, B_{n-1}, B_n$.

The voltage measuring unit 26 is electrically coupled with the control unit 25 to transmit and receive electrical signals. The voltage measuring unit 26 measures, under the control of the control unit 25, the voltage applied between the positive electrode and the negative electrode of each battery cell $B_1, B_2, \ldots, B_{n-1}, B_n$ at a time interval, and outputs a signal indicating the measured magnitude of voltage to the control unit 25. The control unit 25 determines the voltage of each battery cell $B_1, B_2, \ldots, B_{n-1}, B_n$ from the signal outputted from the voltage measuring unit 26 and stores the determined voltage value in the storage unit 29.

The voltage measuring unit 26 includes a voltage measuring circuit commonly used in the art, for example, a differential amplifier. The circuit configuration of the voltage measuring unit 26 for measuring the voltage of each battery cell $B_1, B_2, \ldots, B_{n-1}, B_n$ is obvious to those skilled in the art and its detailed description is omitted herein.

The current measuring unit 27 is electrically coupled with the control unit 25 to transmit and receive electrical signals. The current measuring unit 27 iteratively measures, under the control of the control unit 25, the magnitude of charge current or discharge current of each battery cell $B_1, B_2, \ldots, B_{n-1}, B_n$ at a time interval, and outputs a signal indicating the measured magnitude of current to the control unit 25. The control unit 25 determines the magnitude of current from the signal outputted from the current measuring unit 27 and stores the determined current value in the storage unit 29.

The current measuring unit 27 includes a hall sensor or a sense resistor commonly used in the art. The hall sensor or sense resistor may be installed on a line in which an electric current flows, for example, the high voltage charge line 23. As the battery cells $B_1, B_2, \ldots, B_{n-1}, B_n$ are connected in series, the control unit 25 measures the charge current or discharge current flowing through the high voltage charge line 23 using the current measuring unit 27, and may determine the measured current value as the charge current or discharge current of the battery cells $B_1, B_2, \ldots, B_{n-1}, B_n$. The circuit configuration of the current measuring unit 27 for measuring the magnitude of charge current or discharge current of each battery cell $B_1, B_2, \ldots, B_{n-1}, B_n$ is obvious to those skilled in the art and its detailed description is omitted herein.

The temperature measuring unit 28 is electrically coupled with the control unit 25 to transmit and receive electrical signals. The temperature measuring unit 28 iteratively measures the temperature of each battery cell $B_1, B_2, \ldots, B_{n-1}, B_n$ at a time interval and outputs a signal indicating the measured scale of temperature to the control unit 25. The control unit 25 determines the temperature of each battery cell $B_1, B_2, \ldots, B_{n-1}, B_n$ from the signal outputted from the temperature measuring unit 28 and stores the determined temperature value in the storage unit 29.

The temperature measuring unit 28 includes a thermocouple commonly used in the art. The circuit configuration of the temperature measuring unit 28 for measuring the temperature of each battery cell $B_1, B_2, \ldots, B_{n-1}, B_n$ is obvious to those skilled in the art and its detailed description is omitted herein.

Preferably, the control unit 25 may calculate and monitor the state of charge (SOC) of each of the first to $n^{th}$ battery cells $B_1, B_2, \ldots, B_{n-1}, B_n$ during charging or discharging thereof.

In an aspect, the control unit 25 may estimate the state of charge of each battery cell $B_1, B_2, \ldots, B_{n-1}, B_n$ by integrating the charge current and the discharge current of each battery cell $B_1, B_2, \ldots, B_{n-1}, B_n$ stored in the storage unit 29.

When charging or discharging of each battery cell $B_1, B_2, \ldots, B_{n-1}, B_n$ starts, the initial value of the state of charge may be determined using the voltage of each battery cell $B_1, B_2, \ldots, B_{n-1}, B_n$ measured before charging or discharging starts. The voltage measured before charging or discharging starts corresponds to an open circuit voltage.

To this end, the storage unit 29 includes an open circuit voltage-state of charge lookup table that defines the state of charge for each open circuit voltage, and the control unit 25 may map the state of charge corresponding to the open circuit voltage of each battery cell $B_1, B_2, \ldots, B_{n-1}, B_n$ from the lookup table. The mapped state of charge may be set as an initial value of the state of charge of each battery cell $B_1, B_2, \ldots, B_{n-1}, B_n$.

In another aspect, the control unit 25 may calculate the state of charge of each battery cell $B_1, B_2, \ldots, B_{n-1}, B_n$ using the extended Kalman filter. The extended Kalman filter refers to a mathematical algorithm that adaptively estimates the state of charge of the battery cell using the voltage, current and temperature of the battery cell.

For the estimation of the state of charge using the extended Kalman filter, for example, a reference may be made to Gregory L. Plett's essay "Extended Kalman filtering for battery management systems of LiPB-based HEV battery packs Parts 1, 2 and 3" (Journal of Power Source 134, 2004, 252-261), the disclosure of which may be incorporated herein for reference.

The state of charge of each battery cell $B_1, B_2, \ldots, B_{n-1}, B_n$ may be determined by other known methods for estimating the state of charge selectively using the voltage, temperature and current of each battery cell as well as the current integration method or extended Kalman filter described above.

The storage unit 29 may store data associated with the full charge capacity of each battery cell $B_1, B_2, \ldots, B_{n-1}, B_n$. The full charge capacity is used to calculate the state of charge. The full charge capacity may be calculated by the control unit 25 while charging the high voltage battery until from a fully discharged state to a fully charged state, and stored in the storage unit 29. The full charge capacity may be determined by the current integration method.

Alternatively, the full charge capacity may be determined by other methods known in the technical field to which the present disclosure belongs. Specifically, the control unit 25 determines the total amount of current through the current measuring unit 27 while the state of charge changes as much as a preset reference percent (%). Additionally, the control unit 25 may convert the determined total amount of current on the condition that a change amount of the state of charge is 100%, and determine the converted total amount of current to be the full charge capacity.

When the connector unit 30 is connected to the charging power source unit 31, the control unit 25 starts charging the high voltage battery 21, and performs the following described cell balancing together while charging the high voltage battery 21 until fully charged state.

Figure 3:
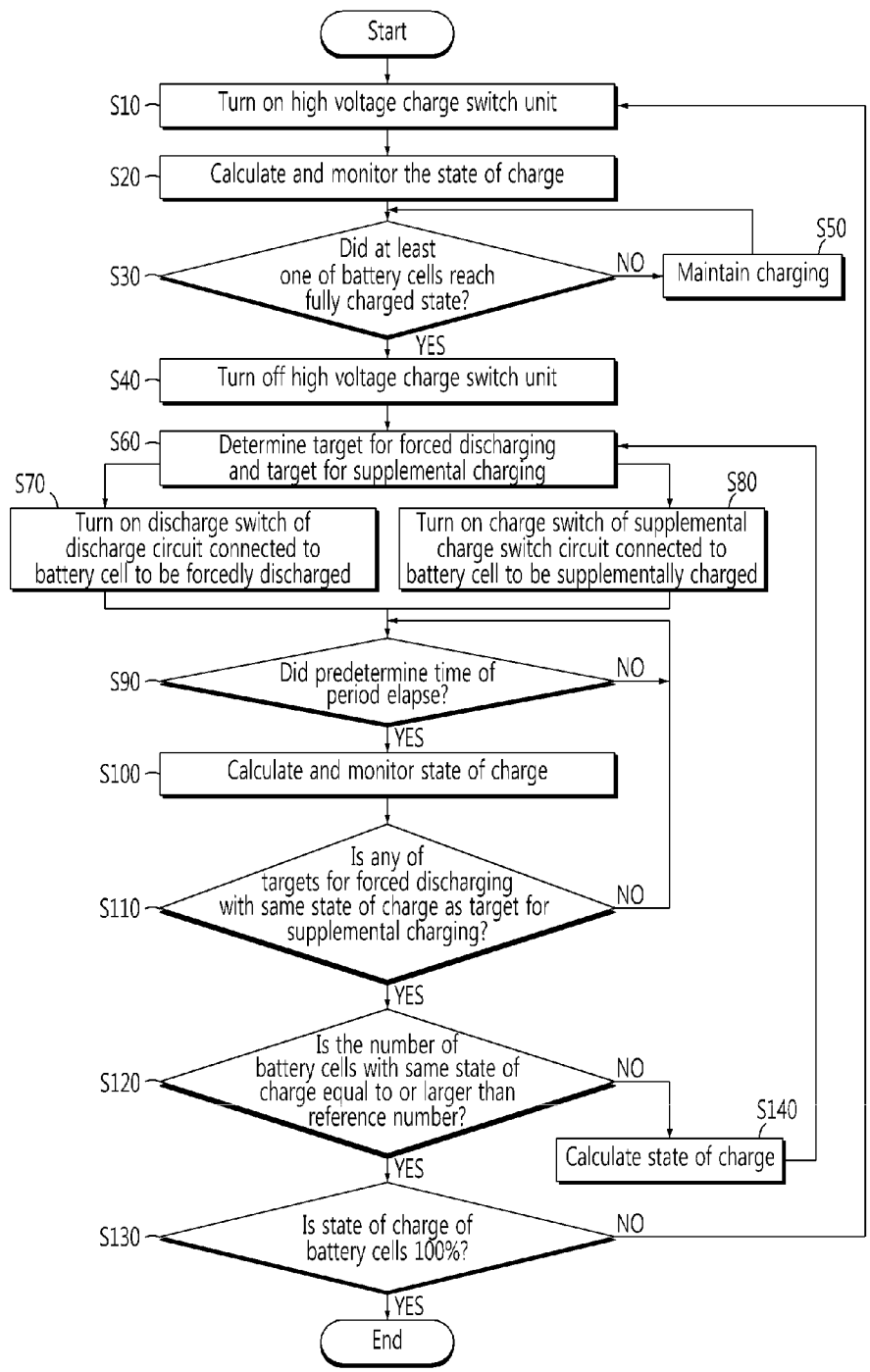
FIG. 3 is a detailed flowchart showing a method for controlling the charge of a high voltage battery by a control unit according to an embodiment of the present disclosure.

FIG. 3 is a detailed flowchart showing a method for controlling the charge of the high voltage battery by the control unit 25 according to an embodiment of the present disclosure.

As shown in FIG. 3, in S10, the control unit 25 turns on the high voltage charge switch unit 22 installed on the high voltage charge line 23 when charging starts (S10). Then, the charge current flows through the first to $n^{th}$ battery cells $B_1, B_2, \ldots, B_{n-1}, B_n$, and charging of the first to $n^{th}$ battery cells $B_1, B_2, \ldots, B_{n-1}, B_n$ starts. The start of charging may be made according to a charge initiation request signal transmitted from the charging power source unit 31. To receive the charge initiation request signal, the connector unit 30 may include a communication interface (See Item 36 in FIG. 2), and the control unit 25 may be electrically coupled to transmit and receive electrical signals through the communication interface 36. Alternatively, the start of charging may be made when the control unit 25 recognizes the connection of the connector unit 30 to the charging power source unit 31.

In S20, the control unit 25 calculates and monitors the state of charge of the first to $n^{th}$ battery cells $B_1, B_2, \ldots, B_{n-1}, B_n$ during charging of the high voltage battery 21. The state of charge may be calculated using the current integration method or the extended Kalman filter.

To calculate the state of charge, the control unit 25 may control the voltage measuring unit 26, the current measuring unit 27 and the temperature measuring unit 28 to acquire voltage, current and temperature data of the first to $n^{th}$ battery cells $B_1, B_2, \ldots, B_{n-1}, B_n$ at a regular time interval and periodically record it in the storage unit 29. Additionally, the control unit 25 may calculate the state of charge of the first to $n^{th}$ battery cells $B_1, B_2, \ldots, B_{n-1}, B_n$ using the current integration method or extended Kalman filter using the acquired data and record it in the storage unit 29.

In S30, the control unit 25 determines if at least one of the first to $n^{th}$ battery cells $B_1, B_2, \ldots, B_{n-1}, B_n$ reached its fully charged state (100%) by referring to the state of charge of the first to $n^{th}$ battery cells $B_1, B_2, \ldots, B_{n-1}, B_n$ during charging of the first to $n^{th}$ battery cells $B_1, B_2, \ldots, B_{n-1}, B_n$.

When the determination result in S30 is YES, in S40, the control unit 25 turns off the high voltage charge switch unit 22 to temporarily stop charging. In contrast, when the determination result in S30 is NO, the control unit 25 moves to S50 to continuously maintain charging of the high voltage battery 21.

When charging is temporarily stopped in S40, in S60, the control unit 25 compares the state of charge of the first to $n^{th}$ battery cells $B_1, B_2, \ldots, B_{n-1}, B_n$, and determines a battery cell with lowest state of charge as a target for supplemental charging and the remaining battery cells to be a target for forced discharging.

In the example shown in FIG. 2, if it is assumed that the state of charge of the first battery cell $B_1$, the second battery cell $B_2$, the n-1$^{th}$ battery cell $B_{n-1}$ and the n$^{th}$ battery cell $B_n$ is 100%, 90%, 80% and 100% respectively, the n-1$^{th}$ battery cell $B_{n-1}$ may be determined to be a target for supplemental charging, and the first battery cell $B_1$, the second battery cell $B_2$ and the n$^{th}$ battery cell $B_n$ may be determined to be a target for forced discharging.

Subsequently, in S70, the control unit 25 operates the discharge circuit connected to the battery cell determined to be a target for forced discharging to forcedly discharge the corresponding battery cell. For the operation of the discharge circuit, the control unit 25 turns on the discharge switch included in the discharge circuit.

At the same time, in S80, the control unit 25 operates the supplemental charge switch circuit connected to the battery cell determined to be a target for supplemental charging to connect the corresponding battery cell to the supplemental charge line 24 to perform supplemental charging. For the operation of the supplemental charge switch circuit, the control unit 25 turns on the charge switch included in the supplemental charge switch circuit.

In S70 and S80, when forced discharging and supplemental charging are simultaneously performed, the state of charge of the battery cells being forcedly discharged reduces, and the state of charge of the battery cell being supplementally charged increases.

After S70 and S80, in S90, the control unit 25 counts the time and determines if a predetermine time of period elapsed. When the determination result in S90 is YES, the control unit 25 performs the next process, and when the determination result in S90 is NO, the control unit 25 holds the process. Here, the predetermined period of time may correspond to a cycle during which the control unit 25 iteratively calculates the state of charge, and may be set to a few or a few tens of msec.

When it is determined to be YES in S90, in S100, the control unit 25 acquires voltage, current and temperature data of the first to n$^{th}$ battery cells $B_1$, $B_2$, . . . , $B_{n-1}$, $B_n$ through the voltage measuring unit 26, the current measuring unit 27 and the temperature measuring unit 28, records it in the storage unit 29, and calculates and monitors the state of charge of the first to n$^{th}$ battery cells $B_1$, $B_2$, . . . , $B_{n-1}$, $B_n$ using the current integration method, the extended Kalman filter, etc.

Subsequently, in S110, the control unit 25 determines if any of the battery cells being forcedly discharged has the same state of charge as the battery cell being supplementally charged.

When it is determined to be YES in S110, the control unit 25 moves the process to S120. On the contrary, when it is determined to be NO in S110, the control unit 25 moves the process to S90 to continuously perform forced discharging and supplemental charging.

When it is determined to be YES in S110, in S120, the control unit 25 determines if the number of battery cells with the same state of charge is equal to or larger than a reference number. In the present step, the number of battery cells with the same state of charge is 2. One is a battery cell initially determined to be a target for supplemental charging, and the other is a battery cell with the state of charge that became equal to the supplementally charged battery cell during forced discharging. The reference number is selected within the range of 2 to n-1, taking the performance of the transformer 35 into account. Here, n is the total number of battery cells. Preferably, the reference number may be fixed, and, may be set to increase with the increasing number of battery cells determined to be a target for supplemental charging in S60. For example, the reference number may be set to be larger at least by 1 than the number of target battery cells for supplemental charging. When the reference number is variable, the reference number may gradually increase during cell balancing. The reference number may be changed by the control unit 250.

When the determination result in S120 is NO, in S140, the control unit 25 calculates the state of charge of all the battery cells and moves the process to S60. In contrast, when the determination result in S120 is YES, S130 is performed. In S140, the calculation of the state of charge may be performed by use of the above-described method. Meanwhile, when the time during which S110 and S120 are performed is shorter than a cycle during which the state of charge is iteratively calculated, the state of charge of all the battery cells calculated in S140 may be set as the state of charge of all the battery cells calculated in S100.

In S120, when the reference number is 2, the control unit 25 moves the process to S130 immediately when the state of charge of the target battery cell for supplemental charging and the state of charge of any one of the target battery cells for forced discharging are equal to each other.

After S140, in S60, the control unit 25 determines a target for forced discharging and a target for supplemental charging again. Accordingly, in S60, a battery cell with the state of charge that became equal to that of the battery cell being supplementally charged among the battery cells being forcedly discharged is additionally designated as a target for supplemental charging. In this case, the reference number may be increased to 3. This reference number is larger by 1 than the number of target battery cells (two) for supplemental charging.

In the case of the example shown in FIG. 2, in S70 and S80, the n-1$^{th}$ battery cell $B_{n-1}$ is supplementally charged, and the first battery cell $B_1$, the second battery cell $B_2$ and the n$^{th}$ battery cell $B_n$ are forcedly discharged. In this instance, the state of charge of the second battery cell $B_2$ becomes equal to the state of charge of the n-1$^{th}$ battery cell $B_{n-1}$ supplementally charged first. Accordingly, when S60 is performed again, the second battery cell $B_2$ and the n-1$^{th}$ battery cell $B_{n-1}$ are determined to be a target for supplemental charging, and the first battery cell $B_1$ and the n$^{th}$ battery cell $B_n$ is determined to be a target for forced discharging.

Subsequently, the control unit 25 performs forced discharging and supplemental charging substantially in the same way as described above (S70, S80). Additionally, the control unit 25 calculates and monitors the state of charge of all the battery cells at a regular time interval (S100). Additionally, the control unit 25 determines if any of the target battery cells for forced discharging has the same state of charge as the target battery cell(s) for supplemental charging (S110). Additionally, the control unit 25 determines if the number of battery cells with the same state of charge is equal to or larger than the reference number (S120). When the determination result in S120 is NO, the process moves to S60. Accordingly, the above-described steps are iteratively performed until the number of battery cells with the same state of charge reaches the reference number during forced discharging and supplemental charging. The reference number may be fixed to one value, or may be changed to a value obtained by adding 1 to the number of target battery cells for supplemental charging determined in S60.

Meanwhile, when the determination result in S120 is YES, in S130, the control unit 25 determines if the state of charge of all the battery cells is 100%.

When the determination result in S130 is YES, the control unit 25 determines that the high voltage battery reached its fully charged state and terminates the charging process. In contrast, when the determination result in S130 is NO, the control unit 25 moves the process to S10 to turn on the high voltage charge switch unit 22 to start charging all the battery cells again. Accordingly, when one of the battery cells reached its fully charged state, cell balancing including forced discharging and supplemental charging together according to the present disclosure is performed again.

According to the present disclosure, as time goes by, the number of target battery cells for supplemental charging increases, while the number of target battery cells for forced discharging reduces. Eventually, the state of charge of all the battery cells reaches 100%.

Additionally, as forced discharging and supplemental charging are simultaneously performed while cell balancing is performed, cell balancing is performed with the state of charge of all the battery cells increasing on the average. Accordingly, it is possible to reduce an amount of energy consumed through forced discharging during cell balancing, and reduce the time taken to fully charge the battery cells.

As a specific example, assume a situation in which when charging four battery cells, the state of charge of the battery cells is 100%, 90%, 80% and 85% at a specific point in time.

In this case, the conventional cell balancing method forcedly discharges all the cells with 100%, 90% and 85% state of charge to adjust the state of charge of all the battery cells to 80%. Accordingly, this process involves energy consumption corresponding to 35% total change amount of the state of charge. The consumed energy is converted to heat by the discharge circuit. Additionally, as the state of charge of all the battery cells reduces to 80%, a difference from the full charge capacity increases on the average and the time taken to fully charge the battery cells increases as much.

In contrast, according to an embodiment of the present disclosure, a battery cell with 80% state of charge is supplementally charged, and battery cells with 100%, 90% and 85% state of charge are forcedly discharged. Additionally, when a battery cell with the same state of charge as the state of charge of the battery cell being supplementally charged appears, forced discharging is stopped and supplemental charging is performed on the corresponding battery cell. Additionally, as time goes by, a battery cell with the same state of charge as the battery cells being supplementally charged appears again, forced discharging is stopped and supplemental charging is performed on the corresponding battery cell. When the number of battery cells with the equalized state of charge reaches the reference number through this process, forced discharging and supplemental charging are stopped and charging of all the battery cells starts again. This process is iteratively performed each time any battery cell reaches a fully charged state during charging, and as a result, the state of charge of all the battery cells reaches 100%.

In the present disclosure, the control unit 25 may optionally include processors, application-specific integrated circuits (ASICs), chipsets, logic circuits, registers, communication modems and data processing devices known in the art to execute the above-described various control logics. Additionally, when the control logic is implemented in software, the control unit 25 may be implemented as an assembly of program modules. In this instance, the program module may be stored in the memory, and executed by the processor. The memory may be inside or outside of the processor, and may be connected to the processor with a variety of well-known computer components. Additionally, the memory may be included in the storage unit 29 of the present disclosure. Additionally, the memory refers collectively to devices in which information is stored irrespective of the type of the device and does not refer to a particular memory device.

Additionally, at least one of the various control logics of the control unit 25 may be combined, and the combined control logics may be written in computer-readable code system and recorded in computer-readable recording medium. The recording medium is not limited to a particular type as long as it can be accessed by a processor included in a computer. For example, the recording medium includes at least one selected from the group consisting of ROM, RAM, register, CD-ROM, magnetic tape, hard disk, floppy disk and optical data recording device. Additionally, the code system may be stored and executed on computers connected via a network in distributed manner. Further, functional programs, codes and code segments for implementing the combined control logics may be readily inferred by programmers in the technical field to which the present disclosure belongs.

The above-described charge control apparatus according to the present disclosure may be included in a battery management system. The battery management system controls the entire operation related to the charge and discharge of the battery, and is a computing system called as a Battery Management System (BMS) in the art.

Additionally, the charge control apparatus according to the present disclosure may be included in a battery pack. The battery pack includes a plurality of battery cells at least connected in series, a housing in which the battery cells are received therein, and a frame in which the charge control apparatus is installed. The state of charge of the plurality of battery cells included in the battery pack may be effectively balanced by the charge control apparatus according to the present disclosure during charging the battery cell until fully charged state.

In describing various embodiments of the present disclosure, it should be understood that the components designated by '~ unit' are elements which are classified functionally rather than physically. Accordingly, each component may be selectively combined with other component, or may be divided into subcomponents for efficient execution of control logic(s). However, it is obvious to those skilled in the art that even though the components are combined or divided, if the sameness of functions is acknowledged, the combined or divided components should be construed as being in the scope of the present disclosure.

While the present disclosure has been hereinabove described with regard to a limited number of embodiments and drawings, the present disclosure is not limited thereto and it should be understood that various modifications and changes may be made by those skilled in the art within the technical aspects of the invention and the equivalent scope of the appended claims.

INDUSTRIAL APPLICABILITY

According to the present disclosure, as time goes by, the number of target battery cells for supplemental charging increases, while the number of target battery cells for forced discharging reduces. Eventually, the state of charge of all the battery cells reaches 100%. Additionally, as forced discharging and supplemental charging are simultaneously performed while cell balancing is performed, cell balancing is performed with the state of charge of all the battery cells increasing on the average. Accordingly, it is possible to reduce an amount of energy consumed through forced discharging during cell balancing, and reduce the time taken to fully charge the battery cells.

What is claimed is:

1. A charge control apparatus for controlling charging of a high voltage battery including first to $n^{th}$ battery cells connected in series, the charge control apparatus comprising:
- first to $n^{th}$ discharge circuits connected respectively to the first to $n^{th}$ battery cells;
- a high voltage charge line through which high voltage charging power is applied to the first battery cell and the $n^{th}$ battery cell, the high voltage charge line including a high voltage charge switch unit;
- a supplemental charge line through which low voltage charging power is applied, the supplemental charge line including a transformer to reduce the charging power;
- first to $n^{th}$ supplemental charge switch circuits connected respectively to the first to $n^{th}$ battery cells to selectively connect the supplemental charge line to at least one of the first to $n^{th}$ battery cells; and
- a control unit electrically coupled with the high voltage charge switch unit, the first to $n^{th}$ discharge circuits, and the first to $n^{th}$ supplemental charge switch circuits,
- wherein the control unit is configured to:
  - (a) calculate a state of charge of the first to $n^{th}$ battery cells,
  - (b) turn off the high voltage charge switch unit when at least one of the first to $n^{th}$ battery cells reaches a fully charged state during charging of the first to $n^{th}$ battery cells,
  - (c) determine at least one of the first to $n^{th}$ battery cells with lowest state of charge to be a target for supplemental charging and the remaining battery cells to be a target for forced discharging,
  - (d) operate the discharge circuit connected to each battery cell determined to be the target for forced discharging to forcedly discharge the corresponding battery cell, and at the same time, operate the supplemental charge switch circuit connected to the battery cell determined to be the target for supplemental charging to connect the corresponding battery cell to the supplemental charge line to supplementally charge the battery cell, and
  - (e) when among the battery cells being forcedly discharged, any battery cell with the same state of charge as the battery cell being supplementally charged appears, stop the operation of the discharge circuit connected to the corresponding battery cell and operate the supplemental charge switch circuit connected to the corresponding battery cell,
- wherein the control unit is configured to, (f) when the number of battery cells with the same state of charge is equal to or larger than a reference number during forced discharging and supplemental charging, stop the operation of all the discharge circuits and all the supplemental charge switch circuits, and turn on the high voltage charge switch unit, and
- wherein the control unit is configured to iteratively execute the control logic of (a) to (f) until the state of charge of the first to $n^{th}$ battery cells reaches a fully charged state.

2. The charge control apparatus according to claim 1, wherein each of the first to $n^{th}$ discharge circuits includes a discharge switch and a discharge resistor, and
each of the first to $n^{th}$ supplemental charge switch circuits includes a charge switch.

3. The charge control apparatus according to claim 1, wherein the control unit is configured to increase the reference number with the increasing number of battery cells to be supplementally charged.

4. The charge control apparatus according to claim 1, further comprising:
- a voltage measuring unit to measure voltage of the first to $n^{th}$ battery cells;
- a current measuring unit to measure the magnitude of a charge current or discharge current of the first to $n^{th}$ battery cells; and
- a temperature measuring unit to measure temperature of the first to $n^{th}$ battery cells,
- wherein the control unit is configured to calculate and monitor the state of charge of each battery cell using the measured voltage values, the measured current values and the measured temperature values of the first to $n^{th}$ battery cells.

5. The charge control apparatus according to claim 1, further comprising:
- a connector unit coupled with a charging power source unit, and to which the high voltage charge line and the supplemental charge line are connected, and
- the supplemental charge line includes a transformer to decrease a charging voltage applied through the connector unit.

6. The charge control apparatus according to claim 5, wherein the connector unit includes an input terminal to which a high voltage charging cable extending from the charging power source unit is connected, a first output terminal to which the high voltage charge line is connected, and a second output terminal to which the supplemental charge line is connected.

7. A battery management system comprising the charge control apparatus according to claim 1.

8. A battery pack comprising the charge control apparatus according to claim 1.

9. A charge control method for controlling charging of a high voltage battery including first to $n^{th}$ battery cells connected in series, the charge control method comprising:
- a first step of charging the high voltage battery by applying high voltage charging power to the first battery cell and the $n^{th}$ battery cell;
- a second step of calculating and monitoring a state of charge of the first to $n^{th}$ battery cells;
- a third step of stopping the application of the high voltage charging power when at least one of the first to $n^{th}$ battery cells reaches a fully charged state during charging of the first to $n^{th}$ battery cells;
- a fourth step of determining at least one of the first to $n^{th}$ battery cells with lowest state of charge to be a target for supplemental charging and the remaining battery cells to be a target for forced discharging;
- a fifth step of operating a discharge circuit connected to each battery cell determined to be the target for forced discharging to forcedly discharge the corresponding battery cell, and at the same time, operating a supplemental charge switch circuit connected to each battery cell determined to be the target for supplemental charging to connect the corresponding battery cell to a supplemental charge line to supplementally charge the battery cell, the supplemental charge line including a transformer to reduce the charging power;
- a sixth step of identifying a battery cell with the same state of charge as the battery cell being supplementally charged among the battery cells being forcedly discharged;

a seventh step of stopping the operation of the discharge circuit connected to the identified battery cell and operating the supplemental charge switch circuit connected to the corresponding battery cell;

an eighth step of stopping the operation of all the discharge circuits and all the supplemental charge switch circuits when the number of battery cells with the same state of charge is equal to or larger than a reference number while forced discharging and supplemental charging are simultaneously performed; and a ninth step of applying the high voltage charging power again.

10. The charge control method according to claim 9, wherein comprises iteratively performing the first to ninth steps until the state of charge of the first to $n^{th}$ battery cells reaches a fully charged state.

11. The charge control method according to claim 9, further comprising:

increasing the reference number with the increasing number of battery cells to be supplementally charged.

12. A charge control apparatus for controlling charging of a high voltage battery including first to $n^{th}$ battery cells connected in series, the charge control apparatus comprising:

first to $n^{th}$ discharge circuits connected respectively to the first to $n^{th}$ battery cells;

a high voltage charge line through which high voltage charging power is applied to the first battery cell and the $n^{th}$ battery cell, the high voltage charge line including a high voltage charge switch unit;

a supplemental charge line through which low voltage charging power is applied;

first to $n^{th}$ supplemental charge switch circuits connected respectively to the first to $n^{th}$ battery cells to selectively connect the supplemental charge line to at least one of the first to $n^{th}$ battery cells; and a control unit electrically coupled with the high voltage charge switch unit, the first to $n^{th}$ discharge circuits, and the first to $n^{th}$ supplemental charge switch circuits, wherein the control unit is configured to:

(a) calculate a state of charge of the first to $n^{th}$ battery cells, (b) turn off the high voltage charge switch unit when at least one of the first to $n^{th}$ battery cells reaches a fully charged state during charging of the first to $n^{th}$ battery cells, (c) determine at least one of the first to $n^{th}$ battery cells with lowest state of charge to be a target for supplemental charging and the remaining battery cells to be a target for forced discharging, (d) operate the discharge circuit connected to each battery cell determined to be the target for forced discharging to forcedly discharge the corresponding battery cell, and at the same time, operate the supplemental charge switch circuit connected to the battery cell determined to be the target for supplemental charging to connect the corresponding battery cell to the supplemental charge line to supplementally charge the battery cell, and (e) when among the battery cells being forcedly discharged, any battery cell with the same state of charge as the battery cell being supplementally charged appears, stop the operation of the discharge circuit connected to the corresponding battery cell and operate the supplemental charge switch circuit connected to the corresponding battery cell, and wherein the control unit is configured to, (f) when the number of battery cells with the same state of charge is equal to or larger than a reference number during forced discharging and supplemental charging, stop the operation of all the discharge circuits and all the supplemental charge switch circuits, and turn on the high voltage charge switch unit.

* * * * *